United States Patent Office 3,655,637
Patented Apr. 11, 1972

3,655,637
METAL COMPLEX DISPERSE FORMAZANE
DYES FOR POLYAMIDE
Karl Heinz Lohmann, Toms River, N.J., assignor to Toms
River Chemical Corporation, Toms River, N.J.
No Drawing. Filed Feb. 24, 1969, Ser. No. 801,807
Int. Cl. C09b 45/00; D06p 1/18, 3/26
U.S. Cl. 260—149       12 Claims

ABSTRACT OF THE DISCLOSURE

Compounds of the formula

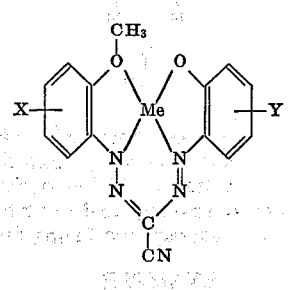

wherein Me is copper or nickel, and X and Y are individually hydrogen, halogen such as chlorine or bromine, lower alkyl such as methyl, ethyl, propyl and butyl, lower alkoxy such as methoxy, ethoxy, propoxy or butoxy, nitro, acetamino, sulfamoyl or lower alkyl sulfonyl provide blue and violet dyeings of very good fastness and dyeing properties, particularly light and atmospheric fading fastness and excellent leveling characteristics on synthetic polyamide fibers. These dyes can also be applied on polyester and polyester blend fabrics by padding a dispersion of the dye, drying and subjecting the padded fabrics to dry heat, e.g., 210° C. for 60 seconds.

BACKGROUND OF THE INVENTION

In the dyeing of synthetic polyamide fibers, particularly of continuous filament synthetic polyamide fibers, difficulties have been experienced in obtaining dyeings which provide both uniform coloring and adequate fastness properties. Thus, it has been found that the use of premetallized or acid dyes, while providing dyeings of good fastness properties, results in unlevel dyeings and in poor coverage of nylon yarns of varying dye affinity. The latter is apparent as light or dark streaks in the dyed material and is generally known in the trade as barré. Hence, the use of conventional disperse dyes, which will provide level and barré free dyeings and which are relatively easy to apply, is widespread despite relative inferiority in fastness properties.

The above considerations are particularly important, for instance, in the dyeing of carpeting and of upholstery fabrics where the conditions of application demand good level dyeing properties and barré coverage, and where the conditions of exposure, particularly to light and to atmospheric contaminants, such as ozone and nitrogen oxides in humid climates, are unusually severe.

SUMMARY OF THE INVENTION

The present invention relates to and has for its objects the provision of dyestuffs particularly suited for the coloring of polyamide fibers.

In accordance with the present invention, it has been found that valuable dyeings are obtained on polyamide fibers by the use as dyestuffs of compounds of the formula

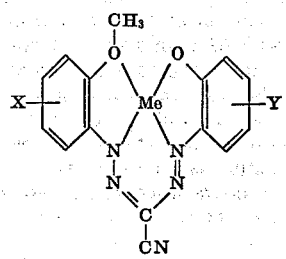

wherein Me is copper or nickel, and X and Y are individually hydrogen, halogen such as chlorine or bromine, lower alkyl such as methyl, ethyl, propyl and butyl, lower alkoxy such as methoxy, ethoxy, propoxy or butoxy, nitro, acetamino, sulfamoyl or lower alkyl sulfonyl.

The compounds of the present invention are prepared according to known procedures in which an intermediate hydrazone of the formula

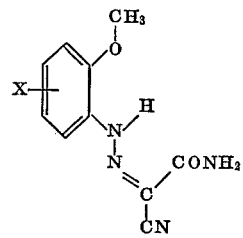

wherein X has the value given above is prepared by the reaction of methylcyanoacetate and the appropriate diazotized amine. The hydrazone intermediate is hydrolysed and then again coupled with the corresponding diazotized amine.

The formazane compound obtained is metallized at elevated temperatures with an agent yielding the particular metal and ammonia, or alternatively, the formazane compound is dissolved in an aprotic polar solvent such as dimethylformamide, dimethylacetamide, dimethylsulfoxide or hexamethyl-phosphoramide and the appropriate metal salt is added.

In an alternative procedure an intermediate hydrazone compound of the formula

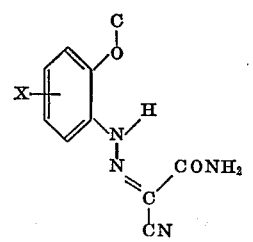

wherein X has the meaning ascribed above is prepared by the reaction of cyanoacetamide and the appropriate diazotized amine. The hydrazone intermediate is then coupled with the corresponding diazotized o-hydroxyamine at a higher pH than that previously employed.

The metallization of the formazane compound is then carried out in the manner described above.

The dyestuffs of the present invention can be used for dyeing or printing polyamide fibers. The dyeings obtained are distinguished by the strength of their tints, by good properties of fastness, particularly to light and to atmospheric contaminants and by good leveling properties.

The dyes will also dye well in combination. If desired, a conventional after-treatment can be given to the dyed material.

The following examples illustrate the invention.

EXAMPLE 1

(a) Preparation of intermediate hydrazone

A solution of 123 g. o-anisidine in 2000 g. water containing 224 g. concentrated hydrochloric acid is diazotized at 0° C. with 69 g. of sodium nitrite in 250 g. cold water. The resulting diazo solution is then neutralized to pH 6 with 36° Bé. sodium hydroxide solution. 100 g. of sodium bicarbonate are added followed by the addition of 103 g. of methyl cyanoacetate over a period of 2 hours. The reaction mixture is then held at 0–5° C. for a further period of 3 hours after which the resultant bright yellow hydrazone intermediate is filtered off, washed with water, and dried, to provide a yield of 229 g. The hydrazone is then treated at 50° C. for 6 hours with 278 g. sodium hydroxide 36° Bé. in 2000 g. water.

(b) Preparation of formazane compound

A slurry of 144 g. of 2-amino-4-chlorophenol in 4000 g. of water containing 224 g. of concentrated hydrochloric acid is diazotised at 0–5° C. with 69 g. sodium nitrite in 250 g. water. The resultant diazo solution is then run into the above hydrolysed hydrazone solution of Example 1(a) at −2 to 0° C. over a period of 45 minutes while maintaining a pH of 12 by constant addition of 36° Bé. sodium hydroxide solution. After 1 hour the pH of the reaction mixture is lowered to 8.5–9 with glacial acetic acid and the precipitated intermediate formazane dye, C-cyano-N-2-methoxyphenyl-N'-5'-chloro-2'-hydroxyphenyl formazane is filtered off, washed with water and dried, returning a yield of 290 g.

(c) Preparation of copper complex

To a slurry of 33 g. of the above formazane compound of Example 1(b) in 240 g. water and 560 g. dimethylformamide there are added 23 g. of cupric acetate monohydrate and the resulting mixture is stirred for 5 hours. There is then added an additional 320 g. of water and the black precipitated 1:1 copper formazane complex of the formula

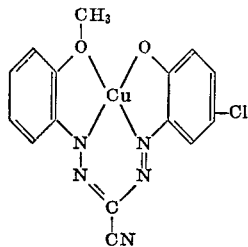

is filtered off and washed with water. The resultant dye cake, in a yield of 38.4 g. based on dry weight, is ground with a dispersing agent to produce a fine dispersion. A knitted fabric of 6,6 continuous filament nylon, is dyed in a 1:40 fabric-liquor ratio with .05% of the above 1:1 copper complex formazane dye based on 100% pigment and weight of fabric and 2% of a wetting agent at a pH of 9 by raising the temperature of the dyebath to 96° C. in 30 minutes and holding at that temperature for 60 minutes. A very level streakfree blue dyeing is obtained having very good light and atmospheric fading fastness. A piece of fabric dyed with the above is heated again with an undyed piece of fabric at 96° C. for 60 min. in a mock dyebath containing no dye. Both pieces of fabric then have an equal depth of shade indicating that the dye has good transfer properties.

EXAMPLE 2

54.2 g. of o-aminophenol in 100 g. water containing 107 g. concentrated hydrochloric acid are diazotized at 0–5° C. with 34.5 g. sodium nitrite in 1000 g. water. The diazonium compound obtained is then coupled to 116.5 g. of saponified hydrazone from Example 1(a) at −2 to 0° C. and pH 12.5, maintaining the pH by addition of sodium hydroxide solution of 36° Bé. The reaction mixture is stirred for 3 hours and then adjusted to pH 6 with glacial acetic acid. The intermediate formazane dye, C-cyano-N-2-methoxyphenyl-N'-2' - hydroxyphenyl formazane, is filtered off, washed with water and dried to yield 130 g. of product. A slurry of 29.5 g. of this formazane dye intermediate is then converted to the 1:1 copper complex following the procedure of Example 1(c), yielding 34.5 g. of product of the formula

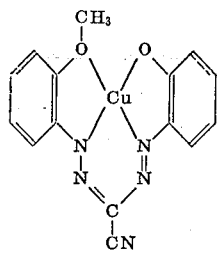

based on dry weight.

The resultant dye cake is ground with a dispersing agent to produce a fine dispersion, which dyes polyamide fiber fabrics from neutral or alkaline dyebaths very level blue with good barré coverage and exhibiting in addition very good light and atmospheric fading fastness.

EXAMPLE 3

A mixture of 29.5 g. of the formazane intermediate from Example 2, C-cyano-N-2-methoxyphenyl-N'-2'-hydroxyphenyl formazane and 27 g. of nickelous acetate tetrahydrate in 560 g. dimethyl formamide and 240 g. water are stirred at room temperature for 5 hours. 320 g. of water are then added and the resulting 1:1 nickel formazane dye complex of the formula

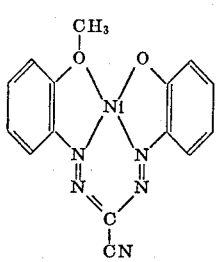

is filtered off and washed with water, in a yield of 33.4 g. based on dry weight.

The resultant dye cake is ground with a dispersing agent to produce a fine dispersion which dyes synthetic polyamide fiber fabrics a very level violet shade having very good light and humidity fastness.

EXAMPLE 4

A slurry of 61.5 g. of o-amino-p-cresol in 100 g. of water containing 143 g. concentrated hydrochloric acid is diazotized at 0–5° C. with 34.5 g. sodium nitrite dissolved in 100 g. water. The diazo solution is then added at −2 to 0° C. over a period of 60 min. to a solution of 116.5 g. hydrolysed hydrazone from Example 1(a) in 1000 g. of water while maintaining the pH at 12.5 with 36° Bé. sodium hydroxide solution. The reaction mixture is stirred at −2 to 0° C. and pH 12.5 for a further 3 hours and is then acidified to pH 6 by addition of glacial acetic acid, followed by filtration, washing with water and drying, yielding 133.3 g. of product. A slurry of 30.9 g. of this intermediate formazane dye, C-cyano-N-methoxyphenyl-N'-2'-hydroxy-5'-methylphenyl formazane is converted to the 1:1 copper dye complex following the procedure of Example 1(c) to yield 36.2 g. of product of the formula

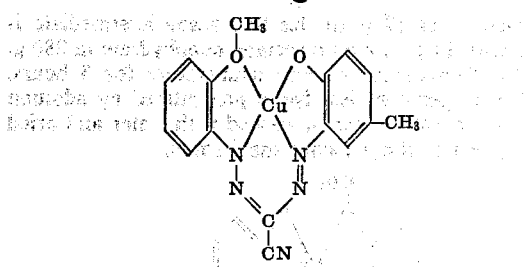

The resultant dye cake is then ground with a dispersing agent. This 1:1 copper formazane dye complex colors polyamide fabrics from neutral to alkaline baths very level blue with good barré coverage and in addition exhibits very good atmospheric fading and light fastness.

EXAMPLE 5

18.7 g. of 2-aminophenol-4-methylsulfone in 200 g. water containing 23.6 g. concentrated hydrochloric acid are diazotized at 0–5° C. with 6.9 g. sodium nitrite dissolved in 25 g. of water. After adjusting the pH of the diazo solution to 5, it is slowly added at 0 to 3° C. over a period of 30 min. to 23.3 g. of hydrolysed hydrazone from Example 1(a) in 200 g. of water at pH 12. After stirring for 6 hours the reaction mixture is acidified and the formazane dye intermediate, C-cyano-N-2-methoxyphenyl-N'-5'-methylsulfonyl-2'-hydroxyphenyl formazane, filtered off and washed with water.

The 1:1 copper complex of this dye having the formula

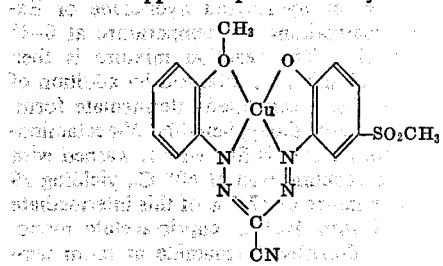

colors synthetic polyamide fibers a bluish violet with good fastness properties.

EXAMPLE 6

35 g. 2-amino-4-methoxyphenol dissolved in a mixture of 150 g. concentrated hydrochloric acid are diazotized with 17.3 g. of sodium nitrite in 40 g. water at 0–5° C. The diazo solution after neutralizing to pH 7 with 38° Bé. potassium hydroxide solution is added at −2 to 0° C. over a period of 30 min. while stirring vigorously to 55.3 g. of hydrolysed hydrazone from Example 1(a) in 500 g. of water and 350 g. of 38° Bé. potassium hydroxide solution. After 35 minutes the reaction mixture is neutralized with glacial acetic acid and the precipitated intermediate formazane dye, C-cyano-N-2-methoxyphenyl-N'-5'-methoxy-2'-hydroxyphenyl formazane, is filtered off, washed and dried to yield 52 g. of product.

A slurry of 31.1 g. of this formazane dye and 20 g. cupric acetate monohydrate in 500 g. dimethyl formamide and 250 g. of water are stirred for 3 hours at room temperature, after which 250 g. of water are added and the 1:1 copper-formazane dye complex of the formula

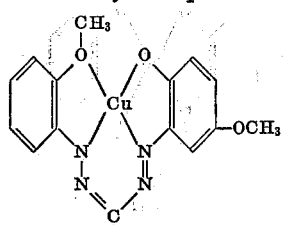

is filtered off and washed with water, in a yield, based on dry weight, of 31 g.

The dye cake is ground to a fine dispersion with a dispersing agent. It dyes polyamide fiber fabrics a level blue with good fastness properties.

EXAMPLE 7

(a) Preparation of intermediate hydrazone

A solution of 68.5 g. 2-amino-4-methylanisole in 1200 g. of water containing 107 g. concentrated hydrochloric acid is diazotized rapidly at 0–5° C. with 34.5 g. sodium nitrite in 100 g. water and is then neutralized to pH 5 with 36° Bé. sodium hydroxide solution. 50 g. sodium bicarbonate, are added, followed by the addition of 52 g. of methyl cyanoacetate at 0–5° C. over a period of 2 hours while stirring vigorously and the reaction mixture then held at that temperature for a further 2 hours. The resultant bright yellow intermediate hydrazone is filtered off, washed with water and dried, yielding 113.3 g. A slurry of 23.5 g. of this hydrazone in 250 g. water is then hydrolysed with 27.8 g. 36° Bé. sodium hydroxide solution for 7 hours at 50° C.

(b) Preparation of formazane compound

A slurry of 12.3 g. m-amino-p-cresol in 200 g. of water containing 23.8 g. of concentrated hydrochloric acid is diazotized at 0–5° C. with 3.45 g. sodium nitrile in 10 g. water. The diazo solution is then added at −2 to 0° C. over a period of 90 min. to 23.5 g. of the above hydrolysed hydrazone of Example 7(a) while maintaining the pH at 12.5 by addition of 36° Bé. sodium hydroxide solution. The reaction mixture is stirred at −2 to 0° C. for a further 2 hours and is then acidified to pH 8.9 with glacial acetic acid. The precipitated intermediate formazane dye, C-cyano-N-5-methyl - 2 - methoxyphenyl-N'-5'-methyl-2'-hydroxyphenyl formazane, is filtered off, washed with cold water and dried in a vacuum oven at 55° C., returning a yield of 25.3 g.

(c) Preparation of 1:1 copper complex

A slurry of 16.2 g. of the formazane intermediate from Example 7(b) and 11 g. cupric acetate monohydrate in 60 g. water and 280 g. dimethyl-formamide are stirred at room temperature for 5 hours, following which 220 g. of water are added and the precipitated 1:1 copper complex of the formula

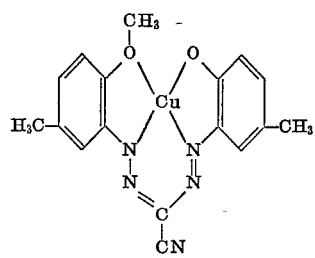

is filtered off, washed with water and dried; yield 18.5 g.

A finely ground dispersion of the dye colors polyamide fabric level greenish blue with very good fastness properties.

EXAMPLE 8

(a) Preparation of intermediate hydrazone

A slurry of 40.4 g. of 4-methoxymethanilamide in 800 g. of water and 47.6 g. of 37% hydrochloric acid is diazotized at 0–5° C. with 13.8 parts sodium nitrite and then neutralized to pH 5 with sodium carbonate, followed by addition of 20 g. sodium bicarbonate. Next, 20.0 g. of methylcyanoacetate are added at 0–5 C. over a period of 2 hours while stirring vigorously and the reaction mixture held another 2 hours, during which the temperature is slowly raised to 45° C. The intermediate is filtered off, washed with cold water and dried to yield 61.8 parts of intermediate hydrazone. A slurry of 31.2 parts of this hydrazone in 250 g. water is then hydrolysed with 30 g. 36° Bé. sodium hydroxide solution for 6 hours at 60° C.

(b) Preparation of formazane compound

The slurry of 10.9 g. of o-aminophenol in 200 g. water and 21.0 g. of 37% hydrochloric acid is diazotized at 0–5° C. with 6.9 g. sodium nitrite in 20.0 g. of water. The diazonium compound is then coupled to the above hydrolysed hydrazone at −2 to 0° C. while maintaining the pH above 12.5 over a period of 30 minutes, after which the reaction mixture is stirred for a further 2 hours and then acidified with glacial acetic acid. The intermediate formazane dye, C-cyano-N-5-sulfamido-2-methoxyphenyl-N'-2'-hydroxyphenyl formazane, is filtered off, washed with water and dried to yield 32.1 g. of product. A partial solution of 20.0 g. of this formazane intermediate in 360 g. dimethyl formamide is stirred with 11.0 g. cupric acetate monohydrate for 3 hours and the resultant 1:1 copper complex precipitated out by addition of 400 g. water, yielding 22.8 g. of product of the formula

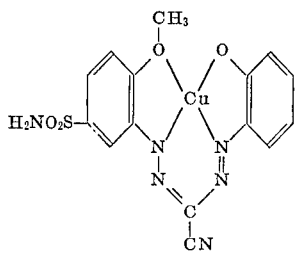

A dispersion of the dye colors nylon fabric a uniform reddish blue with very good light and atmospheric fading fastness.

EXAMPLE 9

To 15.0 g. of hydrolysed hydrazone from Example 1(a), obtained by coupling diazotized o-anisidine to methylcyanoacetate, are added at pH 12.6, 0–3° C., 12.1 g. diazotized 2-amino-1-phenol-5-sulfonamide in 300 g. water. The reaction mixture is stirred for 90 minutes, and the resultant intermediate formazane dye precipitated by addition of glacial acetic acid. The intermediate dye is washed with water and dried in a vacuum oven at 60° C. yielding 18.3 g. of the intermediate formazane dye C-cyano - N - 2 - methoxyphenyl-N'-4'-sulfonamido-2'-hydroxyphenyl formazane. The intermediate formazane is complexed with cupric acetate monohydrate as in Example 1 to yield the following dye:

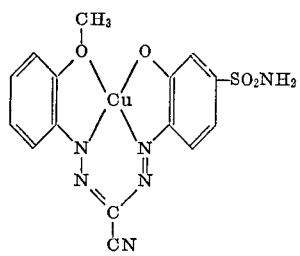

It dyes nylon a violet shade with very good light fastness and resistance to atmospheric fading.

EXAMPLE 10

A slurry of 15.4 g. 2-amino-4-nitrophenol in 400 g. water and 23 g. concentrated hydrochloric acid is diazotized at 5° C. with 6.9 g. sodium nitrite dissolved in 25 g. of water. The resultant diazo solution is slowly run over a period of 30 minutes into a solution of 23.3 g. of hydrolysed hydrazone of Example 1(a) while maintaining the pH at 12.3 and the temperature at −2 to 0° C. After stirring for a further 50 minutes the reaction mixture is acidified with glacial acetic acid and the precipitated intermediate dye filtered off, washed with water and dried yielding 27.2 g. of the formazane intermediate, C - cyano-2-methoxyphenyl-N'-5'-nitro-2'-hydroxyphenyl formazane.

A mixture of 17 g. of this formazane intermediate is stirred with 11 g. of cupric acetate monohydrate in 280 g. dimethyl formamide at room temperature for 3 hours. The 1:1 copper complex dye is precipitated by addition of 280 g. of water, filtered, washed with water and dried yielding 19.3 g. of dye having the formula

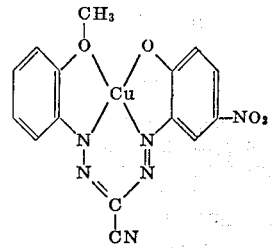

A dispersion of the dye colors nylon a uniform violet with excellent lightfastness and resistance to fading due to atmospheric contaminants, such as ozone and nitrogen dioxide.

EXAMPLE 11

16.6 g. 2-amino-1-hydroxy-4-acetaminobenzene are suspended in 210 g. of water and 22.4 g. hydrochloric acid 37% and cooled to 0° C. A solution of 7.1 g. sodium nitrite in 25 g. water is then added as rapidly as nitrite is taken up, maintaining the temperature below 5° C. At the end excess nitrite is destroyed with sulfamic acid. The diazo solution is then run over a period of 60 minutes into a solution of 23.3 g. of hydrolysed hydrazone of Example 1(a), while maintaining the temperature at 0–3° C. and pH above 12.6. The reaction mixture is then stirred for a further 90 minutes, followed by addition of acetic acid to pH 5. The precipitated intermediate formazane dye, C-cyano-N-2-methoxyphenyl-N'-5'-acetamino-2'-hydroxy phenyl formazane, is filtered off, washed with water and dried in a vacuum oven at 60° C., yielding 29 g. of dry powder. A mixture of 17.6 g. of this intermediate formazane is stirred with 10.5 g. cupric-acetate monohydrate in 320 g. of dimethyl formamide at room temperature for 3 hours. The resultant copper complex dye is precipitated by addition of 320 g. water. After filtration and washing with water the dye is dried yielding 20.2 g. of the dye having the structure

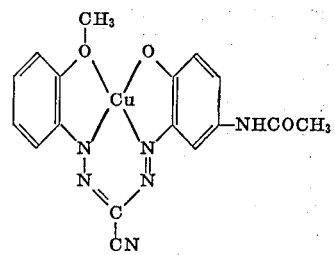

This dye produces a uniform blue coloration on nylon fabrics and exhibits excellent lightfastness and resistance to ozone and nitrogen dioxide gases.

I claim:
1. A compound of the formula

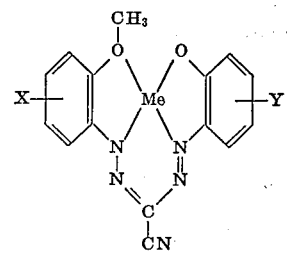

wherein Me is copper or nickel and X and Y are individually selected from the group consisting of hydrogen, chloro, bromo, lower alkyl, lower alkoxy, nitro, acetamino, sulfamoyl and lower alkyl sulfonyl.

2. A compound according to claim 1 having the formula

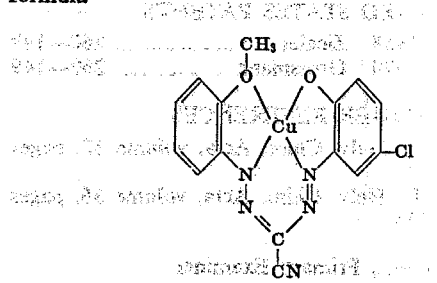

3. A compound according to claim 1 having the formula

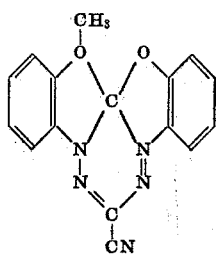

4. A compound according to claim 1 having the formula

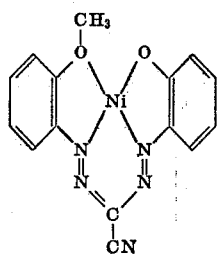

5. A compound according to claim 1 having the formula

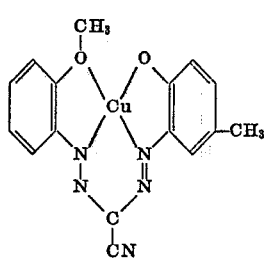

6. A compound according to claim 1 having the formula

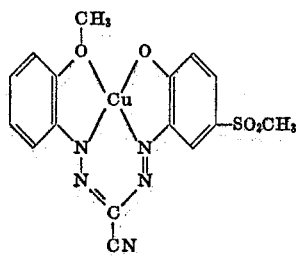

7. A compound according to claim 1 having the formula

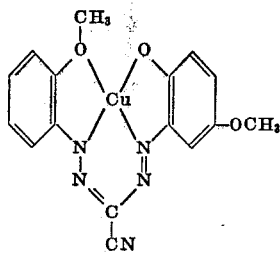

8. A compound according to claim 1 having the formula

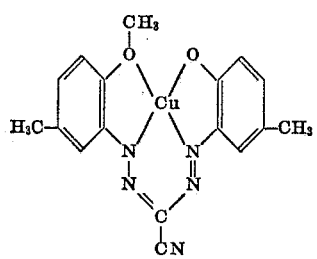

9. A compound according to claim 1 having the formula

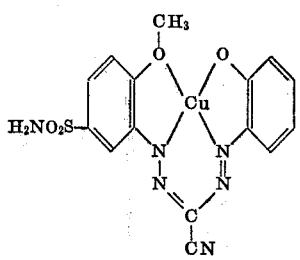

10. A compound according to claim 1 having the formula

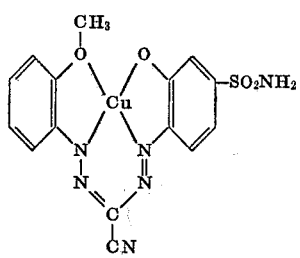

11. A compound according to claim 1 having the formula

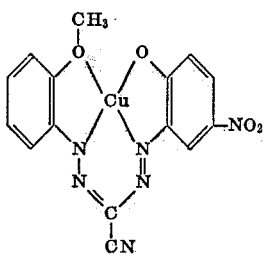

12. A compound according to claim 1 having the formula
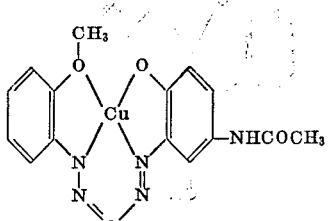
References Cited
UNITED STATES PATENTS
2,864,815  12/1958  Ziegler _____ 260—149
3,497,493  2/1970  Grossmann _____ 260—149
OTHER REFERENCES
Wizinger et al.: Helv. Chim. Acta, volume 32, pages 901 to 912 (1949).
Wizinger et al.: Helv. Chim. Acta, volume 36, pages 531 to 536 (1953).
FLOYD D. HIGEL, Primary Examiner
U.S. Cl. X.R.
260—465 D